United States Patent Office 2,715,147
Patented Aug. 9, 1955

2,715,147

SYNTHESIS OF SUBSTITUTED CYCLO-OCTATETRAENES

Arthur C. Cope, Belmont, and Mark R. Kinter, Cambridge, Mass., assignors, by mesne assignments, to the United States of America as represented by the Secretary of the Navy No Drawing. Application January 19, 1951,
Serial No. 206,924

8 Claims. (Cl. 260—668)

This invention relates to a process for the preparation of substituted cyclooctatetraenes from cyclooctatetraene, and, more particularly, for the preparation of arylcyclooctatetraenes from the reaction of cyclooctatetraene with organometallic compounds by addition followed by a process equivalent to the hydrogen transfer between the initial adduct and cyclooctatetraene.

The properties of substituted cyclooctatetraenes are of considerable interest inasmuch as the structure is a symmetrical cyclic system of alternate double and single bonds possessing greater reactive ability than the stable benzene ring. Substituted cyclooctatetraenes appear to be useful chemical intermediates and to possess ultraviolet absorption spectra suitable as ultraviolet screening agents. Cyclooctatetraene has been prepared by the polymerization of acetylene and by a number of complex methods, notably by synthesis from pseudopelletierine by degrading through methylgranatanine to cyclooctadiene and dehydrogenating to cyclooctatetraene.

Organolithium compounds are known to add to the carbon-carbon double bonds of aryl-substituted olefins and fulvenes and to conjugated dienes in the initiation of polymerization. The occurrence of the above addition reactions suggested the possibility of treating cyclooctatetraene with an organometallic compound, such as phenyllithium, to obtain substituted cyclooctatrienes as possible intermediates in the synthesis of substituted cyclooctatetraenes. It was found, however, that the reaction led directly to substituted cyclooctatetraenes as well as to cyclooctatrienes.

For example, phenyllithium is found to react slowly with cyclooctatetraene in ether solution in an inert atmosphere, or more rapidly if the ether is distilled and the mixture heated at 90° centigrade, to give a mixture of phenylcyclooctatetraene and organolithium compounds which are decomposed by hydrolysis. Distillation of the decomposition products yields a low boiling fraction containing cyclooctatrienes and recovered cyclooctatetraene and a high boiling fraction containing principally the phenylcyclooctatetraene and phenylcyclooctatriene. The phenylcyclooctatetraene may be purified by conversion into a crystalline 1:1 complex with silver nitrate from which the hydrocarbon is regenerated by treatment with ammonium hydroxide or aqueous sodium chloride. The recovery of cyclooctatetraene from the low boiling fraction may be carried out by extraction with silver nitrate.

Additional information regarding the reaction of phenyllithium with cyclooctatetraene is obtainable by decomposing the intermediate organolithium compounds by carbonation rather than by hydrolysis. The amount of phenylcyclooctatetraene in the product is found to be unchanged but the low boiling fraction does not contain cyclooctatrienes, instead an acid, which readily polymerizes, is found.

Accordingly, the following reactions occur when cyclooctatetraene is treated with phenyllithium:

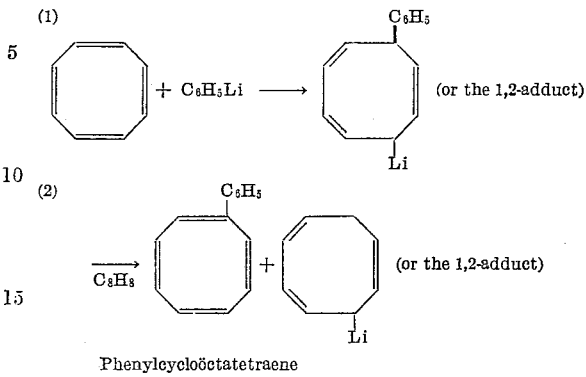

Phenylcyclooctatetraene

Hydrolysis of the organolithium compounds found in Reactions 1 and 2 yield:

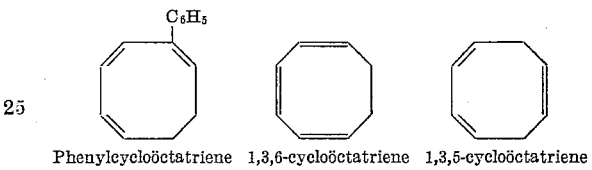

Phenylcyclooctatriene   1,3,6-cyclooctatriene   1,3,5-cyclooctatriene

The yield of phenylcyclooctatetraene is found to be in the range of 14–26%.

Extension of the synthesis of substituted cyclooctatetraenes by reaction of cyclooctatetraene with other organoalkalimetallic compounds yields products consistent with the results indicated for the phenyllithium Equations 1 and 2. Thus, reaction of cyclooctatetraene with p-dimethylaminophenyllithium yields p-dimethylaminophenylcyclooctatetraene and a mixture of cyclooctatrienes with recovered cyclooctatetraene. Phenylsodium reacts similarly with cyclooctatetraene, yielding phenycyclooctatetraene and cyclooctatrienes.

To carry out the reaction of phenyllithium with cyclooctatetraene the following procedure has been found effective on a laboratory scale:

A dry one-liter three-necked flask was equipped with a mechanical stirrer, a dropping funnel and a reflux condenser, and the funnel and condenser were protected with drying tubes attached to a source of nitrogen under pressure. The system was flushed with nitrogen, and 300 milliliters of dry ether and 7.65 grams (1.1 gram atoms) of lithium, in the form of ⅛ inch wire cut into short lengths, were placed in the flask. A solution of 78.5 grams (0.5 mole) of bromobenzene in 100 milliliters of dry ether was added with stirring during seventy minutes at a rate that maintained reflux, and the mixture was heated under reflux for an additional period of one hour. 104 grams (1.0 mole) of cyclooctatetraene was added, and the reflux condenser was replaced by a 20 x 1.5 centimeter Vigreux column. The mixture was heated gradually to a bath temperature of 90° centigrade during one hour, while most of the ether distilled, and then was stirred at that temperature for two hours. The product, an orange colored mixture containing organolithium compounds, was cooled in ice, and the dry ether which had been removed by distillation was returned to the flask. 500 milliliters of water was added slowly with stirring to decompose the organolithium compounds by hydrolysis, and the red ether layer was separated, washed three times with water, and dried over magnesium sulphate. Two distillations of the low boiling fraction through a 20 x 1.5 centimeter helix-packed column separated the ether solvent and benzene formed by hydrolysis of phenyllithium from the product (72.9 grams having a boiling point 74–79° centigrade at 97 mm. of mercury pressure $n^{25}_D$ 1.5295). Distillation of the residue through a fractionating column separated 37.3 grams of a high boiling fraction (boiling point 94–95° centigrade at 0.3 mm. of mercury pressure, $n^{25}_D$ 1.6168) containing a mixture of phenylcycloöctatetraene and phenylcycloöctatriene.

Phenylcycloöctatetraene was isolated as the silver nitrate complex by treating a solution of the high boiling fraction in 300 milliliters boiling absolute ethanol with 35.2 grams finely powdered silver nitrate. After heating for ten minutes, all of the silver nitrate dissolved forming a yellow-green solution, and on cooling to 0° centigrade a yellow-green, crystalline silver nitrate complex separated. The crystals were collected on a filter, washed with two 50 milliliter portions of cold ether, and air dried for one-half hour. The silver nitrate complex was decomposed by shaking with a solution of 100 milliliters of concentrated ammonium hydroxide in 100 milliliters of water. The orange liquid which was formed was extracted with two 50 milliliter portions of ether and the combined extracts were washed with water, dried over magnesium sulphate, and concentrated. Distillation through a fractionating column yielded 22.6 grams of phenylcycloöctatetraene as an orange liquid having a boiling point of 94–95° centigrade at 0.3 mm. mercury pressure, $n^{25}_D$ 1.6181, $d^{25}_4$ 1.0335.

Phenylcycloöctatriene was isolated from the alcohol filtrate and ether washings which were separated from the phenylcycloöctatetraene-silver nitrate complex. The solution was concentrated under reduced pressure to a volume of 50 milliliters and shaken with 50 milliliters of concentrated ammonium hydroxide and 50 milliliters of water. The oil which separated was extracted with two 25 milliliter portions of pentane, and the combined extracts were washed with water, and then extracted with six 25 milliliter portions of 50% aqueous silver nitrate. Treatment of the extracts with ammonium hydroxide caused the separation of a small additional amount of slightly impure phenylcycloöctatetraene, which after extraction and distillation yielded 1.6 grams of product. The pentane solution remaining after extraction with silver nitrate was washed with water, concentrated and the residue was distilled through a fractionating column. Approximately 1 gram of biphenyl was separated as a first fraction, followed by three fractions of phenylcycloöctatriene totaling 8.52 grams having a boiling point of 90–92° centigrade at 0.3 mm. mercury pressure, $n^{25}_D$ 1.6100–1.6174.

The low boiling fraction (72.9 grams) yielded 1% bromobenzene, 26% cycloöctatrienes, and 73% cycloöctatetraene. The cycloöctatetraene was separated by extracting a solution of the fraction in 70 milliliters of pentane with nine 100 milliliter portions of 20% aqueous silver nitrate, which was the minimum amount that removed the yellow color from the pentane solution. Water was added when necessary during the extractions to dissolve any solid cycloöctatetraene-silver nitrate complex. The silver nitrate extracts were added to 300 milliliters of concentrated ammonium hydroxide, and the yellow cycloöctatetraene, which separated, was extracted with ether and distilled through a 20 x 1.5 centimeter helix-packed column to recover 52.1 grams of cycloöctatetraene. The colorless pentane solution was washed with water, dried over magnesium sulphate, and the pentane distilled through the helix-packed column. The residue was distilled through a fractionating column and yielded 10.5 grams of a mixture of cycloöctatrienes, having boiling point 74–78° centigrade at 93 mm. mercury pressure and $n^{25}_D$ 1.5158. The ultraviolet absorption spectrum of this fraction indicated that it was a mixture of 1,3,5- and 1,3,6-cycloöctatrienes. The mixture of cycloöctatrienes was heated under reflux in a nitrogen atmosphere for two hours in a solution of potassium t-butoxide in t-butyl alcohol to isomerize the 1,3,6-cycloöctatriene to 1,3,5-cycloöctatriene.

Alternately the organolithium compounds present in the reaction mixture obtained by heating phenyllithium and cycloöctatetraene may be carbonated rather than decomposed by hydrolysis. The reaction mixture was cooled in an ice bath, diluted with 50 milliliters of dry ether, and forced onto several hundred grams of finely powdered solid carbon dioxide. The transfer was completed by rinsing the reaction flask with two 50 milliliter portions of dry ether. After volatilization of the carbon dioxide, 200 milliliters of water and enough sodium hydroxide to make the mixture definitely basic to litmus were added. The ethereal layer was separated, washed with water, dried over magnesium sulphate and the ether distilled through a 20 x 1.5 centimeter helix-packed column. Distillation of the residue through a fractionating column gave a low boiling fraction and a high boiling fraction.

Redistillation of the low boiling fraction yielded cycloöctatetraene, 42.7% recovery of the original amount of cycloöctatetraene. Treatment of the high boiling fraction as before with a silver nitrate ethanol solution yielded phenylcycloöctatetraene.

The results of the carbonation reaction indicated that the amount of phenylcycloöctatetraene in the product was unchanged but the low boiling hydrocarbon fraction contained practically no cycloöctatriene. However, the acid products obtained by acidification of the alkaline aqueous extract of the reaction mixture after carbonation tended to polymerize.

The identities of the products of the process can be confirmed according to the following procedures:

Phenylcycloöctatetraene may be characterized by quantitative hydrogenation in methanol in the presence of a palladium catalyst, requiring four molar equivalents of hydrogen, to form phenylcycloöctane; by reaction with maleic anhydride in benzene to form a colorless adduct; by reaction with p-benzoquinone to form a yellow adduct; by formation of yellow-green complex with silver nitrate, and by its ultraviolet and infrared absorption spectra.

Phenylcycloöctatriene may be characterized by the absorption of three molar equivalents to form phenylcycloöctane and by comparison of infrared and ultraviolet spectra with the spectra of an authentic sample.

The nature of the mixture of cycloöctatrienes may be determined by infrared and ultraviolet spectra, and by the maleic anhydride adduct after converting the mixture of 1,3,6- and 1,3,5-cycloöctatrienes to 1,3,5-cycloöctatriene by treatment with potassium t-butoxide.

The recovered cycloöctatetraene may be isolated and characterized by the formation of its silver nitrate complex.

As indicated previously, p-dimethylaminophenyllithium reacts with cycloöctatetraene to form an organolithium complex from which p-dimethylaminophenylcycloöctatetraene may be derived. On a laboratory scale, a solution of p-dimethylaminophenyllithium was prepared from 20 grams (0.1 mole) of recrystallized p-bromodimethylaniline and 1.54 (0.22 gram atom) of lithium in 85 milliliters of dry ether in an atmosphere of nitrogen (as described by Gilman et al., Journal of the American Chemical Society, volume 55, page 1252, 1933). After the preparation of the organolithium compound, 20.8 grams (0.20 mole) of cycloöctatetraene was added, and the mixture was gradually heated to 90° centigrade during forty-five minutes as the ether distilled. Stirring and heating continued at the reaction temperature of 90° centigrade for a period of two hours, after which the mixture was cooled in ice and 50 milliliters of ether was added, followed by 100 milliliters of water which was added with cooling and stirring. The red ether layer was separated and combined with a 25 milliliter ethereal extract of the aqueous layer. The ether solution was washed with water, and then was extracted with four 50 milliliter portions of 4% hydrochloric acid to separate basic products. The ethereal solution was washed once with water and the combined aqueous and acid extracts were made basic with 25% aqueous sodium hydroxide. The red liquid which separated was extracted with three 50 milliliter portions of ether, and the combined extracts were washed three times with water, dried over magnesium sulphate, and concentrated. The red liquid residue was distilled through a fractionating column to separate 4.5 grams of N,N-dimethylaniline from a high boiling residue. The residue was distilled in a short-path still at 0.4 mm. mercury pressure with a heating block temperature of 200° centigrade. The red liquid distillate solidified rapidly, yielding as an orange solid, 8.2 grams of p-dimethylaminophenylcycloöctatetraene. The crude product was recrystallized twice from hot methanol as 5.9 grams of small orange leaflets having a melting point of 89.5–90.7° centigrade.

The ethereal solution containing reaction products not extracted by 4% hydrochloric acid were concentrated and the residue distilled through a fractionating column, yielding 14.4 grams of liquid having a boiling point of 76–79° centigrade at 92 mm. mercury pressure. Extraction of a solution of this material in 25 milliliters of pentane with seven 25 milliliter portions of 20% aqueous silver nitrate by the procedure described above separated 8.7 grams of recovered cycloöctatetraene and 3.83 grams of a mixture of cycloöctatrienes, which were treated with potassium t-butoxide in t-butyl alcohol to yield 3.33 grams of 1,3,5-cycloöctatriene.

The general utility of this method for the preparation of substituted cycloöctatetraenes by the reaction of cycloöctatetraene with organoalkalimetallic compounds is illustrated by the reaction of cycloöctatetraene with phenylsodium. As carried out on a laboratory scale, phenylsodium was prepared by adding 11.2 grams of chlorobenzene to 5.75 grams of powdered sodium and 75 milliliters of dry benzene in an atmosphere of nitrogen by a process based on the one described by Gilman et al. in Journal of the American Chemical Society, volume 62, page 1517, 1940, in which toluene was used as a solvent. 20.8 grams of cycloöctatetraene was added and the mixture was stirred and heated under reflux for one hour, and then was cooled in ice while 50 milliliters of ethanol were added, followed by 75 milliliters of water. Dilute hydrochloric acid was added until the mixture was neutral, and the benzene layer was separated. The aqueous layer was extracted with 50 milliliters of ether, and the combined benzene and ethereal solutions were washed twice with water and dried over magnesium sulphate. The solvent was distilled through a 20 x 1.5 centimeter helix-packed column, and the products were fractionated through a fractionating column. The low and high boiling fractions were separated into their components by treatment with silver nitrate by procedures similar to those described for separating the products formed in the reaction of phenyllithium and cycloöctatetraene.

The low boiling fraction yielded recovery of 6.7 grams of cycloöctatetraene and 2.44 grams of a mixture of cycloöctatrienes. The high boiling fraction of 5.43 grams yielded 3.95 grams of phenylcycloöctatetraene.

The reaction of organoalkalimetallic compounds with cycloöctatetraene is shown to proceed by addition, followed by a process equivalent to the transfer of the metal hydride from the addition compound to another molecule of cycloöctatetraene. The process also discloses methods of isolating the reaction products.

While in the foregoing disclosure the present invention has been described with respect to certain specific processes, it will be understood that one skilled in the art, without departing from the spirit of the invention, may employ various processes.

What is claimed is:

1. The method of preparing phenylcycloöctatetraene which comprises heating cycloöctatetraene in a solution of a reactant of the formula RM in which R is the phenyl radical and M is a member of the group consisting of lithium and sodium in an inert atmosphere to obtain a mixture of phenylcycloöctatetraene and organometallic complexes, cooling the reaction products, decomposing the complexes so formed by hydrolysis, and separating the phenylcycloöctatetraene from the other reaction products.

2. The method of preparing phenylcycloöctatetraene which comprises heating cycloöctatetraene in a solution of a reactant of the formula RM in which R is the phenyl radical and M is a member of the group consisting of lithium and sodium in an inert atmosphere to obtain a mixture of phenylcycloöctatetraene and organometallic complexes, cooling the reaction products, decomposing the organometallic complexes so formed by hydrolysis, and separating the phenylcycloöctatetraene from the reaction products by fractionation under reduced pressure to remove a low boiling fraction and the solvent from a high boiling residue, isolation of a crystalline complex from the high boiling residue with silver nitrate, and regeneration with ammonium hydroxide.

3. The method of preparing phenylcycloöctatetraene which comprises heating cycloöctatetraene in a solution of a reactant of the formula RM in which R is the phenyl radical and M is a member of the group consisting of lithium and sodium in an inert atmosphere to obtain a mixture of phenylcycloöctatetraene and organometallic complexes, cooling the reaction products, decomposing the complexes so formed by carbonation, and separating the phenylcycloöctatetraene from the other reaction products.

4. The method of preparing phenylcycloöctatetraene which comprises heating cycloöctatetraene in a solution of a reactant of the formula RM in which R is the phenyl radical and M is a member of the group consisting of lithium and sodium in an inert atmosphere to obtain a mixture of phenylcycloöctatetraene and organometallic complexes, cooling the reaction products, decomposing the complexes so formed by carbonation, and separating the phenylcycloöctatetraene from the other reaction products by fractionation under reduced pressure to remove a low boiling fraction and the solvent from a high boiling residue, isolation of a crystalline complex from the high boiling residue with silver nitrate and regeneration with ammonium hydroxide.

5. The method of preparing phenylcycloöctatetrane which comprises heating cycloöctatetraene in an ether solution of phenyllithium in a nitrogen atmosphere at 90° centigrade for a period of one to two hours to form a mixture of phenylcycloöctatetraene and organolithium complexes, cooling the reaction products in ice, decomposing the complexes so formed by hydrolysis, separating the reaction products by distillation under reduced pressure into a low boiling fraction and a high boiling residue, and isolating the phenylcycloöctatetraene from the high boiling residue as a yellow-green crystalline phenylcycloöctatetraene-silver nitrate complex, and regenerating phenylcycloöctatetraene from the silver nitrate complex by treatment with ammonium hydroxide.

6. The method of preparing phenylcycloöctatetraene which comprises heating cycloöctatetraene in a benzene solution of phenylsodium in a nitrogen atmosphere at 90° centigrade for a period of one to two hours to form a mixture of phenylcycloöctatetraene and organosodium complexes, cooling the reaction products in ice, decomposing the complexes so formed by hydrolysis, separating the reaction products by distillation under reduced pressure into a low boiling fraction and a high boiling residue, and isolating the phenylcycloöctatetraene from the high boiling residue as a yellow-green crystalline phenylcycloöctatetraene-silver nitrate complex, and regenerating phenylcycloöctatetraene from the silver nitrate complex by treatment with ammonium hydroxide.

7. The method of preparing a substituted phenylcyclo-

öctatetraene which comprises heating cycloöctatetraene in a solution of a reactant of the formula RM, in which R is a substituted phenyl radical and M is a member of the group consisting of lithium and sodium, in an inert atmosphere to obtain a mixture of substituted phenylcycloöctatetraene and organometallic complexes, cooling the reaction products, decomposing the complexes so formed by carbonation, and separating the substituted phenylcycloöctatetraene from the other reaction products.

8. Phenylcycloöctatetraene.

References Cited in the file of this patent

Cope et al.; Jour. Amer. Chem. Soc., vol. 72 (January 1950), pages 630–1 (2 pages).